(12) United States Patent
Quinn et al.

(10) Patent No.: US 8,311,045 B2
(45) Date of Patent: Nov. 13, 2012

(54) SYSTEM AND METHOD FOR SELECTIVELY APPLYING A SERVICE TO A NETWORK PACKET USING A PREEXISTING PACKET HEADER

(75) Inventors: Paul Quinn, San Francisco, CA (US); Kenneth Durazzo, San Ramon, CA (US); Darrel Lewis, San Francisco, CA (US); Barry Raveendran Greene, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 505 days.

(21) Appl. No.: 11/400,695

(22) Filed: Apr. 7, 2006

(65) Prior Publication Data

US 2007/0237147 A1 Oct. 11, 2007

(51) Int. Cl.
*H04L 12/28* (2006.01)
*H04L 12/56* (2006.01)

(52) U.S. Cl. ............... 370/395.43; 370/389; 370/392; 370/395.21; 370/471; 370/473

(58) Field of Classification Search ............. 370/395.21, 370/395.43
See application file for complete search history.

(56) References Cited

U.S. PATENT DOCUMENTS

| 5,556,170 | A | 9/1996 | Lai et al. | |
| 6,614,787 | B1* | 9/2003 | Jain et al. | 370/390 |
| 6,898,641 | B1* | 5/2005 | Kobayashi | 709/238 |
| 7,382,725 | B1* | 6/2008 | Kakadia | 370/230 |
| 2002/0032798 | A1* | 3/2002 | Xu | 709/238 |
| 2003/0161264 | A1* | 8/2003 | Ho et al. | 370/229 |
| 2005/0097357 | A1* | 5/2005 | Smith | 713/201 |
| 2005/0135378 | A1* | 6/2005 | Rabie et al. | 370/395.21 |

\* cited by examiner

*Primary Examiner* — Jae Y Lee
(74) *Attorney, Agent, or Firm* — Fish & Richardson P.C.

(57) ABSTRACT

A system for selectively applying a service to a packet in a network. In a specific embodiment, the system includes a mechanism for encoding service information in a network-compatible packet header and providing encoded data in response thereto. In a more specific embodiment, the network-compatible header includes a Multi-Protocol Label Switching (MPLS) header, a Generic Route Encapsulation (GRE) header, and/or a Layer-2 Tunneling Protocol (L2TP) header.

15 Claims, 3 Drawing Sheets

SYSTEM AND METHOD FOR SELECTIVELY APPLYING A SERVICE TO A NETWORK PACKET USING A PREEXISTING PACKET HEADER

BACKGROUND OF THE INVENTION

This invention is related in general to networks and more specifically relates to systems and methods for controlling how services are applied to data in a network.

For the purposes of the present discussion, services may be any software or hardware applications that implement actions on information. Network services are employed in various demanding applications including network security, voice services, load balancing, and network analysis for various enterprise networks, such as data centers and Internet-Service-Provider (ISP) networks. Such applications demand versatile mechanisms for efficiently applying network services to data.

Conventionally, network data is encapsulated and transferred in packets. Packets may be sent sequentially through various service nodes, which may be applications that implement various services. Alternatively, a network device, such as a router, will analyze each packet independently and then send each packet to specific service nodes based on the analysis, but without knowledge of previous services applied to each packet.

Unfortunately, such systems and methods for provisioning services often result in complex services that are difficult to deploy, and often further result in redundant processing as packets sent between devices must be reanalyzed and classified by each device to determine which services shall be applied to a packet. Furthermore reclassification at each network device may cause application of redundant services to a given packet, and the services may be applied in a suboptimal order. Accordingly, network throughput and resources may be compromised by use of inefficient service provisioning systems and methods.

DETAILED DESCRIPTION OF EMBODIMENTS OF THE INVENTION

A preferred embodiment of the present invention implements a system for selectively performing a service on or applying a service to a packet in a network. The system includes a mechanism for encoding service information in a network-compatible packet header and providing encoded data in response thereto. In a more specific embodiment, the network-compatible header includes a Multi-Protocol Label Switching (MPLS) header, a Generic Route Encapsulation (GRE) header, and/or a Layer-2 Tunneling Protocol (L2TP) header.

Hence, certain embodiments of the present invention leverage existing network support for certain headers, such as MPLS headers, to facilitate applying services to a packet. Certain embodiments described herein may provide a scalable user-friendly way of applying a service and/or tracking application of a service to a packet. The system may reside on platform blades and/or external appliances and/or as one or more processes within a platform. The system may be seamlessly integrated into an existing infrastructure. Certain embodiments of the present invention may further enhance portability of a service node across plural customer networks or network segments.

For clarity, various well-known components, such as power supplies, router blades, Internet Service Providers (ISPs), and so on, have been omitted from the figures. However, those skilled in the art with access to the present teachings will know which components to implement and how to implement them to meet the needs of a given application.

Figure 1:
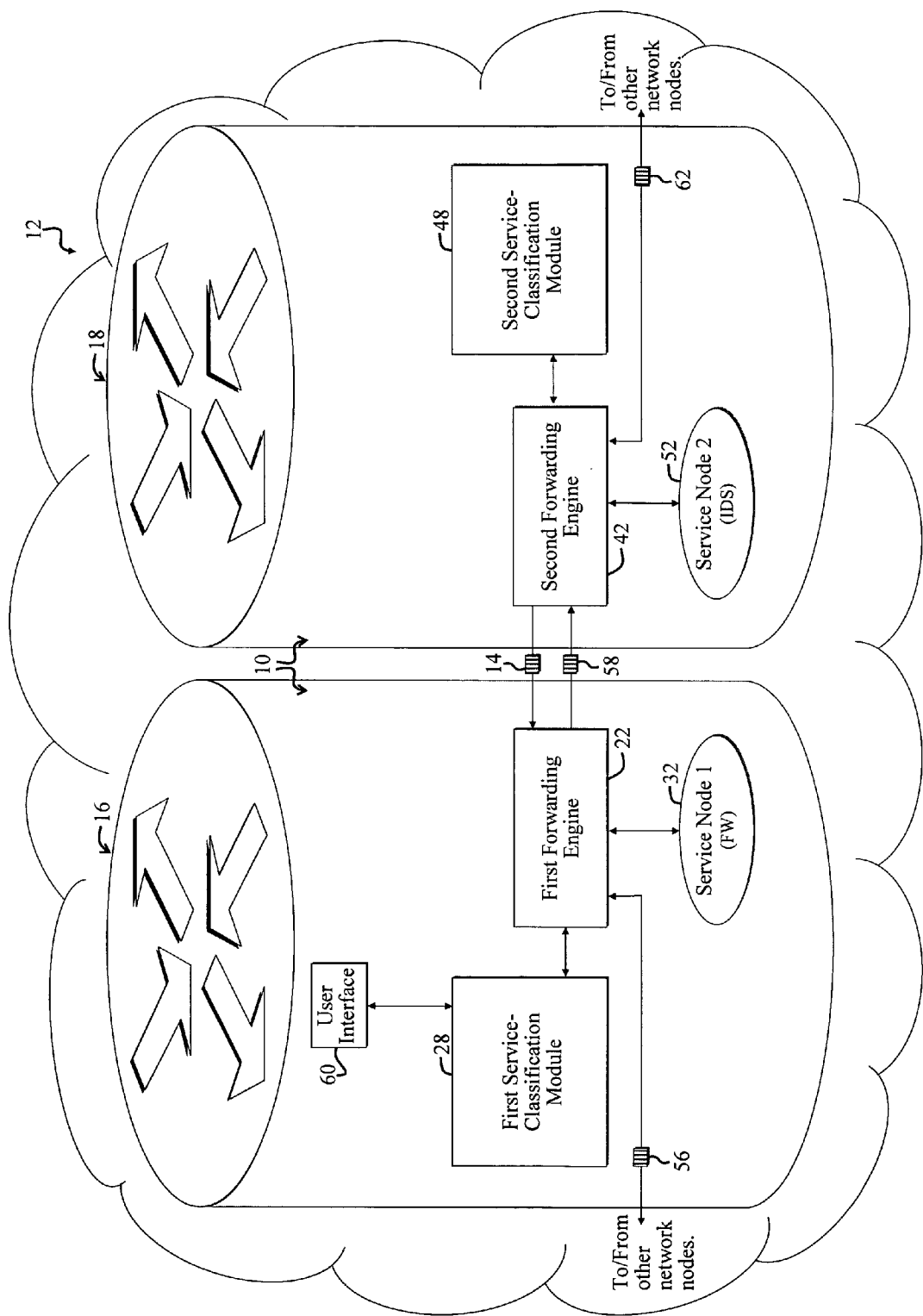
FIG. 1 is a diagram illustrating a system for selectively performing services on a packet in a network according to an embodiment of the present invention.

FIG. 1 is a diagram illustrating system 10 for selectively performing a service on packet 14, 56, 58, 62 in network 12 according to an embodiment of the present invention. Examples of services include firewall filtering, intrusion detecting, content switching, secure socket layering, anomaly detecting, network analyzing, global site selecting, and so on. For illustrative purposes, system 10 is shown implemented in first router 16 and second router 18, which intercommunicate via one or more network protocols, such as Transmission Control Protocol (TCP)/Internet Protocol (IP).

First router 16 includes a first service-classification module 28 in communication with first forwarding engine 22. First forwarding engine 22 communicates with first service node 32 and may send and receive packets, such as packets 58, 14 to/from other network entities, such as second router 18.

First service-classification module 28 communicates user interface 60 and the first forwarding engine 22. Forwarding engine 22 further communicates with first service node 32 and second forwarding engine 42. Second forwarding engine 42 is located in second router 18. For illustrative purposes, the first service node 32 implements a FireWall (FW) and/or a Network Analysis Module (NAM).

Second router 18 includes second forwarding engine 42, second service-classification module 48, and second service node 52, which are analogous to modules 22, 28, 32, respectively of first router 16. Second router 18 is similar to first router 16 with the exception that second router 18 communicates with a different service node 52 and is not shown including a user interface. However, the second router 18 may be equipped with a user interface without departing from the scope of the present invention.

For the purposes of the present discussion, a service node may be any software or hardware routine(s) or module(s) that perform actions on data, such as data included in a packet. A service node generally implements a service, such as Intrusion Detection Service (IDS), Secure Socket Layer (SSL), FireWall (FW), and so on.

A header may be any section of a packet, message, frame, or other information that can store information. A network-compatible packet header may be a header that is readable by plural nodes in a network. Packet headers that are often compatible with existing enterprise networks include MPLS, Generic Route Encapsulation (GRE), and Layer-2 Tunneling Protocol (L2TP) headers. An MPLS header may be any header that plural network entities are adapted to process. Generally, any header that could be employed for MPLS purposes may be considered an MPLS header.

A packet may be any information that is encapsulated for transmission in a network. Examples of packets include frames, messages, or sections thereof.

A network platform, such as a Layer-3 switch or router, may be any network device or entity that can communicate with another network device or entity via a protocol employed by network devices to communicate via the associated network. The terms network nodes and platforms are employed interchangeably.

A network entity may be any thing, such as a device, module, or data, that is in or coupled to a network. Network entities may be software, hardware, and/or data entities. Examples of network entities include switches, routers, forwarding engines, service nodes, databases, packets, and so on. A protocol may be any set of instructions or method for communicating information.

In an exemplary operative scenario, incoming packets 14, 56 received by the first forwarding engine 22 are transferred to the first service-classification module 28 for initial service classification. The first service-classification module may employ various methods to classify packets. The resulting packet classifications will determine what available services 32, 52 should be applied to the packets 14, 56. Exact packet-classification methods are application specific and may be determined by those skilled in the art to meet the needs of a given application without undue experimentation.

First service-classification module 28 may append a network-compatible packet header, such as an MPLS header to each packet 14, 56 based on packet classifications. Contents of a given packet header, such as information indicating how a given service should be applied to a packet, may be retrieved from the service nodes 32, 52 or from the user interface 60, by the first service-classification module via the first forwarding engine 22 and/or the second forwarding engine 42. In the preferred embodiment, packet header is an MPLS header that is selectively augmented with service information.

In the present specific embodiment, the service information includes service-coding information indicating service codes that correspond to the services 32, 52. The service coding may further specify mappings between a given service and a packet classification. For example, a certain class of packet may require application of a specific service. The service may be identified via one or more codes, and the service may be associated with a specific class or type of packet. The codes may be implemented via bit sequences that are selectively placed in packet headers as discussed more fully below.

Service coding details indicating what bits or sequences of bits represent what service(s) and/or service status may be negotiated between nodes 16, 18 in advance of applying a service to a packet. In the preferred embodiment, the packet header used to maintain service information, and optionally service status, is or can be handled like an MPLS header.

First service node 32 receives incoming packets that have been classified by the first service-classification module 28, the second service-classification module 48, or other service-classification module (not shown) connected to the network 12. Packet headers associated with the received packets, also called ingress packets, are analyzed by the first service node 32 to determine packet status, such as whether one or more of the services 32, 52 have been applied to the packets.

First forwarding engine 22 may check incoming packet 14 to determine if packet 14 has been classified in accordance with an embodiment of the present invention. If packet 14 has been classified, such as by second service-classification module 48, then the service information maintained in the header is employed by first forwarding engine 22 to send packet 14 to the appropriate service 32 if indicated in the header.

If incoming packet 14 has not been classified, the packet is sent to first service-classification module 28 for classification. First service-classification module 28 determines the service needs of packet 14, i.e. classifies the packet, and then assigns the packet a service if needed based on the service needs, i.e., packet class. The packet class may be generally based on packet type, where a packet type may be defined based on various factors or characteristics, including accompanying traffic details, user-identification numbers associated with given packets, and so on.

Alternatively, first forwarding engine 22, instead of first service-classification module 28, includes packet-classification routines to observe all incoming packets and then classify them as needed in accordance with predetermined service coding rules. Alternatively, instead of determining packet type or class and then assigning a predetermined service thereto based on the packet type or class, each packet may be assigned a custom service based on other packet characteristics.

First service-classification module 28 may implement additional functions other than classifying packets and assigning a service thereto. For example, first service-classification module 28 may implement one or more routines for selectively inserting a service, i.e., code corresponding thereto, into a packet MPLS header.

Exact details as to when a service is inserted in a packet header by first service-classification module 28 are application specific. In one implementation, a service may be inserted into packet header when a service becomes available. User interface 60, such as a switch console with Command Line Interface (CLI) functionality, may be employed to control first service-classification module 28 to facilitate incorporation of a service into system 10.

First service-classification module 28 may further implement one or more routines to automatically assign packet classes to a service in accordance with predetermined service coding.

After a packet is classified, the appropriate service information is incorporated into a header of the packet to enable first forwarding engine 22 to read the header and then send the packet to the service 32 if indicated in the header. Packet classification information, such as status information indicating whether a packet has been classified and information indicating what service class the packet is associated with, may be encoded in separate fields in a header.

In the preferred embodiment, the employed header is a header that is currently understood by network nodes, such as routers 16, 18, i.e., the header is network-compatible. This greatly facilitates conveying service information between network nodes 16, 18. Examples of suitable headers include, but are not limited to MPLS, Layer-2 Tunneling Protocol (L2TP), and Generic Route Encapsulation (GRE) headers.

In the exemplary operative scenario, first packet 14 is classified as a packet that should be acted upon by first service 32. First forwarding engine 22 is adapted to selectively send packet 14 to first service 32 for processing after classification based on the packet header and service code(s) included therein. After packet 14 is filtered by the FW of first service 32, first service 32 updates the status of the packet by appropriately modifying the header to indicate that FW has been applied to packet 14. First service node 32 may then send the processed packet and accompanying updated header to an forwarding engine internal to the first service node 32 or elsewhere, such as the first forwarding engine 22 or the second forwarding engine 42. another forwarding engine. In certain embodiments, such service-status information is omitted from the packet headers.

In the present operative scenario, after first service 32 has been applied to packet 14, packet 14 is sent to second router 18 as partially processed packet 58. Various modules 42, 48 of second router 18 operate similarly to corresponding modules 22, 28 of first router 16 with the exception that second forwarding engine 22 communicates with second service 52, which implements an Intrusion Detection System (IDS) in the present specific embodiment.

If packet 14 is partially processed by 32, yielding the partially processed packet 58, and if the partially processed packet 58 does not require further classification, the partially processed packet 58 may be forwarded directly to second service node 52 or via the second forwarding engine 42. Consequently, partially processed packet 58 may avoid second service-classification module 48.

Second forwarding engine 42 may receive partially processed packet 58 and then observe the relevant packet header to determine whether or not to apply the second service 52 to the packet 58. Codes corresponding to second service 52 may be incorporated into the header of the packet 58, called the service header, upon classification of the packet by second service-classification module 48 if required and if not already done so by first service-classification module 28.

Hence, second forwarding engine 42 references the service header and then forwards packet 58 to the second service 52 if indicated in the packet header. Alternatively, first service node 32 forwards packet 58 to second service node 52, bypassing first forwarding engine 22 and second forwarding engine 42. After completion of the IDS service by second service 52, packet 58 is marked, by second service node 52, as having been processed by second service node 52.

First forwarding engine 22 and second forwarding engine 42 may facilitate selectively applying a service to other packets 56, 62, respectively, received from different devices in network 12. Furthermore, forwarding engines 22, 42 may forward packets, to which services have been applied, to other devices in network 12.

Figure 2:
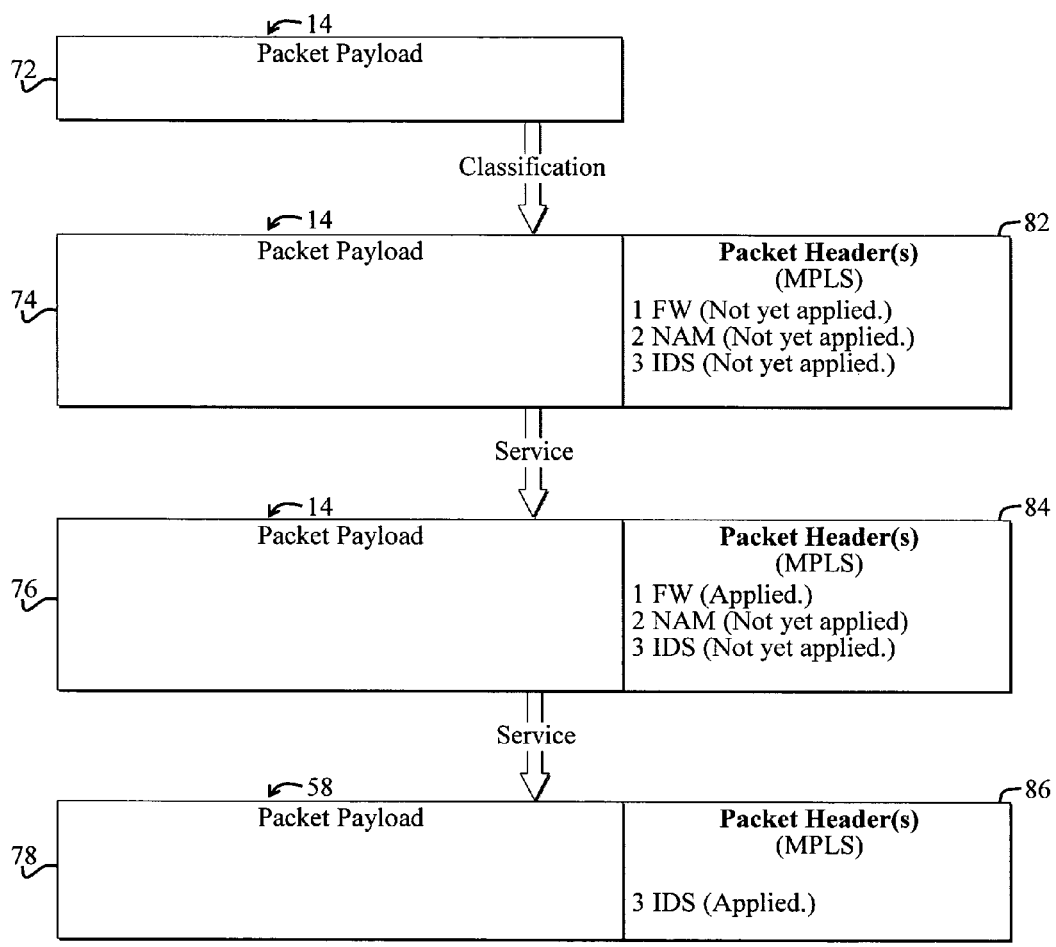
FIG. 2 is a diagram illustrating exemplary contents of a packet header as the packet traverses various modules of the system of FIG. 1.

FIG. 2 is a diagram illustrating exemplary contents of packet header 82-86 that is adapted for use with system 10 of FIG. 1 as packet 14, 58 traverses between various modules of system 10 of FIG. 1. With reference to FIGS. 1 and 2, in first stage 72, packet 14 passes to first service-classification module 28.

For the purposes of the present discussion, service information may be any information specifying a service to be applied to a packet. Service information may optionally include service-status information and service-sequence information indicating whether a service has been applied to a packet and the order in which services should be applied.

In the present operative scenario, after packet 14 passes through first service-classification module 28, initial header 82 is added to the packet 14 at second stage 74. Initial header 82 has been modified by first service-classification module 28 to indicate service information. The service information identifies services to be performed, such as FW, IDS, and NAM; the order in which the services should be performed, such as FW→NAM→IDS; and the status indicating whether or not a given service has been applied. Exact methods for encoding such information are application specific and may be determined by those skilled in the art with access to the present teachings without undue experimentation.

After packet classification, packet 14 passes back to first service node 32 for application of the first service to the packet 14. At third stage 76, certain services have been applied to packet 14 as indicated in second updated header 84. Second updated header 84 has been updated by first service node 22 to indicate that FW corresponding to first service has been applied to the packet 14.

Subsequently, at fourth stage 78, packet 14 has been sent to second router 18 as partially processed packet 58. At fourth stage 78, partially processed packet 58 has been processed by second service 52. For illustrative purposes, second service 52 has modified second updated header 84 by stripping certain header information and adding status information pertaining to second service 52, as indicated in third updated header 86. Information pertaining to the FW and NAM processing indicated in second updated header 84 is omitted from third updated header 86. However, third updated header 86 includes information pertaining to the IPS associated with first service 52. Exact details pertaining to whether, when, and how packet information, including service-status information, is stripped from or inserted into a packet header is application specific.

While service information is shown occupying entire headers 82-86, the service information may be included in one or more specific sections of MPLS headers 82-86 without departing from the scope of the present invention. The exact sections of MPLS headers 82-86 used for maintaining service information are application specific.

Hence, with reference to FIGS. 1 and 2, system 10 acts as system 10 for selectively performing a service 32, 52 on packet 14, 15, 56, 60 in network 12 that includes first mechanism 28, 48 for determining a service 32, 52 to be performed on packet 14, 15, 56, 60. Second mechanism 28, 48 encodes information in network-compatible packet header 82-86, wherein the information pertains to service 32, 52 and provides encoded data in response thereto. Third mechanism 32, 52 employs the encoded data to selectively implement service 32, 52 to be performed on packet 14, 56, 58, 62.

In the specific embodiment, network-compatible header 82-86 includes an MPLS header, which may be employed by a preexisting protocol employed by nodes 16, 18, such as MPLS protocol. System 10 is implemented in plural network platforms 16, 18.

System 10 may also be considered service-application system 10 for network 12. Service-application system 10 includes service-classification module 28, 48 that is adapted to classify information, such as information included in a packet, by assigning a service 32, 52 to the information. The service may be assigned to the information by associating one or more of the predetermined codes with the information. Forwarding-engine module 22, 42 communicates with service-classification module 28, 48 and employs the one or more predetermined codes to selectively apply the service 32, 52 to the information.

Service-classification module 28, 48 includes one or more routines for positioning the predetermined codes in portions 82-86 of message 14, 58, 56, 62 that are associated with the information. Portion 82-86 of message 14, 58, 56, 62 include a portion that is understood by one or more devices 16, 18 coupled to network 12 that may receive the message. Portion 82-86 of the message includes an MPLS header or other suitable header understood by participating network platforms 16, 18. Forwarding-engine module 22, 42 includes one or more routines adapted to selectively extract the one or more codes from the section of MPLS header 82-86 and then forward message 14, 58, 56, 62 to service node 32, 52 as indicated by the one or more codes.

Hence certain embodiments of the present invention may provide an effective platform-independent way for controlling how a service is applied to a packet in a network. Embodiments of the present invention may help eliminate the redundant application of a service to a packet; may facilitate inserting a service at a different location in a network; and may eliminate redundant message classifications performed by different network nodes.

While headers 82-86 of FIG. 2 are periodically changed and updated, such as with service status information, headers 82-86 may be implemented as static headers without departing from the scope of the present invention. In this case, headers 82-86 would include a static service to be executed. The code for the static service would be created during a packet-classification phase that is implemented by service-classification modules 28, 48 of FIG. 1. Service nodes 32, 52 derive the special header contents corresponding to the service or list thereof. Forwarding engines 22, 42, also called forwarding planes, may use the special header contents.

By leveraging existing headers, such as MPLS headers, certain embodiments of the present invention are readily supported across different platforms. Any preexisting header that is supported by one or more desired platforms may be employed to implement embodiments of the present invention.

Certain embodiments may leverage existing sections of such headers to provide a per-packet service context, which may facilitate service insertion and enhance network efficiency by eliminating unnecessary processing of packets. Certain embodiments of the present invention are applicable both within and between routers and switches, such as Cisco Category 6K switches with distributed forwarding engines.

Any network nodes or devices, such as switches, may be adapted to employ embodiments of the present invention and to convey packet context, i.e., information, thereby enabling initial packet classification information and servicing requirements to be carried to different participating nodes.

The header information may detail paths that packets should take through a list of services. For example, a given encoded bit, such as 5, may specify a firewall, while another bit, such as a 6, occurring in the header may specify an Intrusion Prevention System (IPS) service corresponding to an IPS service node. The order of the encoded bits in the header may indicate the preferred order in which the services should be performed.

In summary, new packet headers are created, such as by service-classification modules 28, 48 and service nodes 32, 52 of FIG. 1, that contain desired lists of services. The new headers are then appended or prepended to packets based on packet classification. The headers ensure that the service or ordered list thereof is processed as desired. The headers may further contain information pertaining to which services have been processed and where (next hop) to send the packets next. Platforms that were not involved in classifying a given packet need not reclassify the packet, since the necessary service information is already included in the packet header.

Figure 3:
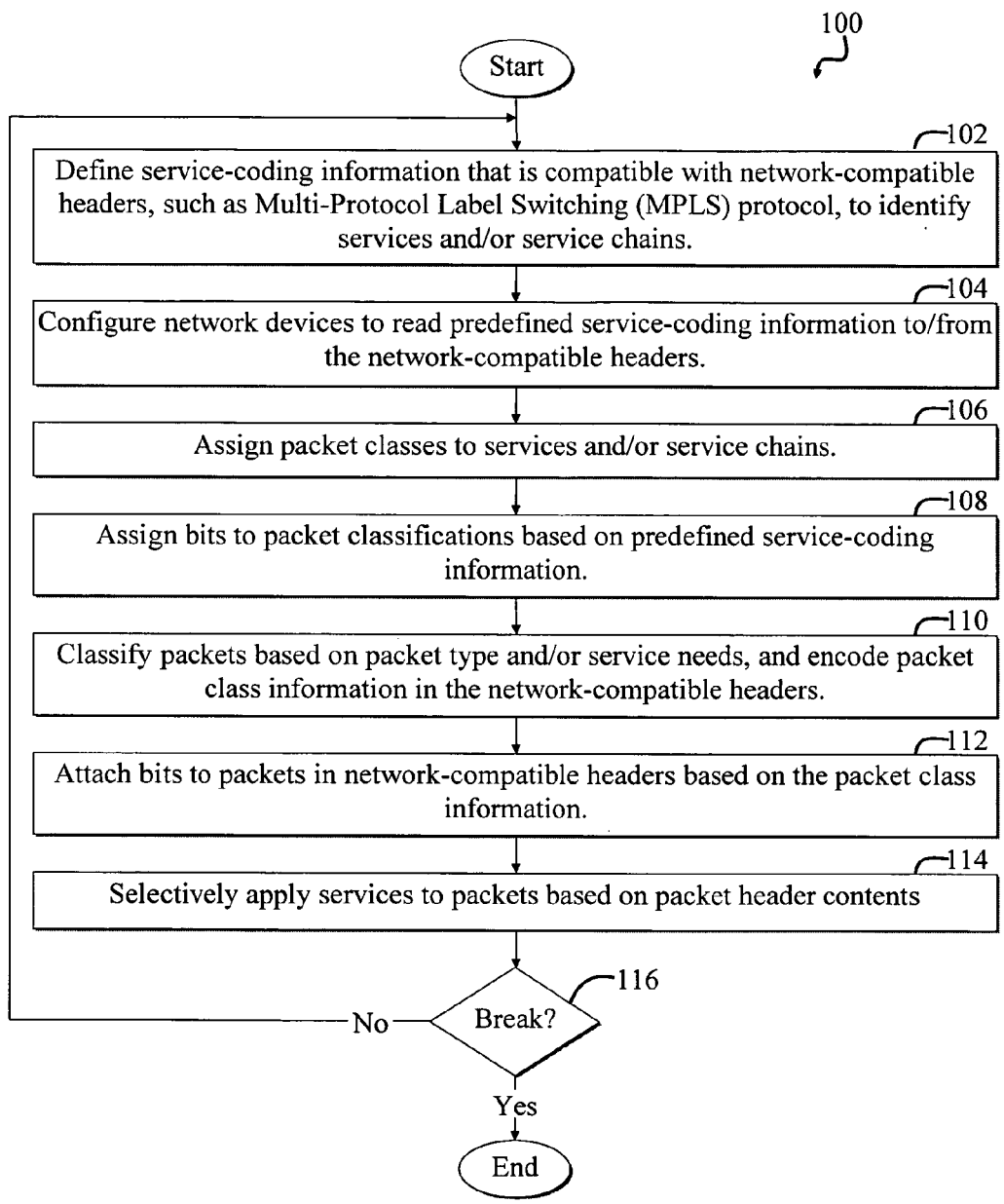
FIG. 3 is a flow diagram of a method that is adapted for use with the system and accompanying network of FIG. 1.

FIG. 3 is a flow diagram of method 100 that is adapted for use with system 10 an accompanying network 12 of FIG. 1. Method 100 includes initial code-defining step 102, wherein service codes are defined. The service codes are compatible with headers, such as MPLS headers, understood by nodes in the network. The service codes may identify services and/or service chains to be applied to a given packet and/or class of packets. The codes may further specify how service-status information and packet-class information is encoded in packet header.

Subsequently, device-configuring step 104 is performed. Device-configuring step 104 includes configuring network devices to read predefined service-coding information, as defined in code-defining step 102, to/from packet headers.

Next, packet classes are assigned to services and/or service chains in accordance with predetermined user-configurable rules in class-assigning step 106.

Subsequently, bit-assigning step 108 involves assigning bits to packet classes based on the service-coding information established in code-defining step 102 and device-configuring step 104.

Packets are then classified in packet-classifying step 110. The packets are classified based on packet type and/or service needs. Packet class information may be encoded in packet service header, which may be implemented any header that is readily understood by participating nodes, such as nodes 16, 18 of FIG. 1. Such readily understood headers may be preexisting headers that are associated with a network-compatible protocol.

Subsequently, bit-attaching step 112 involves attaching bits to packets in the service headers based on packet classification information as determined by packet-classifying step 110.

After bits pertaining to appropriate service codes are attached to a packet, service-providing step 114 is performed. Service-providing step 114 involves selectively providing services based on the contents of the packet service header, which may include packet-classification information.

Subsequently, break-checking step 116 is performed. Break-checking step 116 determines whether a system break has occurred. A system break may occur when a network is disabled or system 10 of FIG. 1 is otherwise disabled. When a system break occurs, method 100 completes. Otherwise, code-defining step 102 continues as new packet types, services, and/or rules are employed.

Various steps 102-116 of method 100 may be omitted, changed, or reordered without departing from the scope of the present invention. For example, steps 106-110 based on packet classes may be omitted. Instead of assigning services to classes and then assigning classes to packets, packets may be assigned services directly.

As another example, method 100 may be replaced with a more generalized method. An exemplary more generalized method includes determining a desired service to apply to a packet; attaching to or including in the packet, information pertaining to the desired service; and then exchanging the information between nodes in the network.

Another more generalized method involves determining a service to be performed on a packet; encoding information in a network-compatible packet header, wherein the information pertains to the service, and providing encoded data in response thereto; and then employing the encoded data to selectively implement the service.

Although embodiments of the invention are discussed primarily with respect to router-router architecture, any acceptable architecture, topology, protocols, or other network and digital processing features can be employed. In general, service-classification modules, service-registration modules, and so on, can be implemented via any device with processing ability or other requisite functionality.

Although processes of the present invention and the hardware executing the processes may be characterized by language common to a discussion of the Internet (e.g., "router," "forwarding plane"), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as different service nodes, can be executing in a single machine or in different machines. A single program can be operating as a client for one information transaction and as a server for a different information transaction. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer-readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", an and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, Title, Background, or Field of the Invention, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system comprising:
   at least one processor; and
   non-transitory machine-readable media including instructions executable by the at least one processor, the instructions configured to cause the at least one processor to perform operations including:
   defining service coding information that are compatible with headers understood by nodes in a network, wherein the service coding information are configured to identify services applicable to a packet;
   receiving rules that are configured by a user;
   associating packet classes with the services based on the rules configured by the user;
   classifying a received packet into a packet class;
   determining service information for the received packet, wherein the service information includes service coding information indicating services applicable to the packet, service status information indicating whether the services have been applied to the packet and a service sequence information indicating an order in which the services should be performed;
   encoding a first set of bits included in a header of the packet in one or more sequences of bits based on the determined service information for the packet, wherein each sequence of bits includes a first portion indicating a service applicable to the packet and a second portion indicating service status information for an associated service and wherein an order of the sequences of bits indicate service sequence information;
   encoding a second set of bits included in the header based on packet classification information that includes classification status information indicating whether the packet has been classified, and information indicating the packet class associated with the packet, wherein the second set of bits is assigned based on the service coding information;
   providing a service to the packet based on information included in an encoded sequence of bits; and
   updating the service status information in the second portion of the associated sequence of bits to indicate that the service specified by the first portion of the sequence of bits has been provided to the packet.

2. The system of claim 1, wherein the header corresponds to a header employed by a preexisting protocol employed for communications in or between one or more network platforms within which the system is implemented.

3. The system of claim 2, wherein the preexisting protocol includes multi-protocol label switching (MPLS) protocol.

4. A system comprising:
   one or more processors; and
   a non-transitory machine-readable medium including instructions executable by the one or more processors for performing operations comprising:
   defining service coding information that are compatible with headers understood by nodes in a network, wherein the service coding information are configured to identify services applicable to a packet;
   associating packet classes with the service codes;
   classifying a received packet into a packet class;
   attaching sequences of bits included in a header of the received packet based on the packet class, wherein each of the sequences of bits include a first portion indicating a service to be performed on the received packet, a second portion indicating service status information for an associated service, and wherein an order of the sequences of bits indicate an order in which the services should be performed;
   encoding a second set of bits included in the header based on packet classification information that includes classification status information indicating whether the received packet has been classified, and information indicating the packet class associated with the received packet, wherein the second set of bits is assigned based on the service coding information;
   providing services to the received packet based on information included in the attached sequences of bits; and
   updating the service status information in the attached sequences bits in the header to indicate whether an associated services have been performed.

5. The system of claim 4, wherein the non-transitory machine-readable medium further includes instructions for performing operations comprising:
   inserting the service coding information in the header associated with the packet.

6. The system of claim 5, wherein the non-transitory machine-readable medium further includes instructions for performing operations comprising:
   causing the packet to be sent to a service node based on the service coding information.

7. The system of claim 6, wherein the header includes a multi-protocol label switching (MPLS) protocol header.

8. A method comprising:
   defining service coding information that are compatible with headers understood by nodes in a network, wherein the service coding information are configured to identify services applicable to a packet;
   receiving rules that are configured by a user;
   associating packet classes with the services based on the rules configured by the user;
   classifying a received packet into a packet class;
   determining service information for the received packet, wherein the service information includes the service coding information indicating services applicable to the packet, service status information indicating whether a service has been applied to the packet, and a service sequence information indicating an order in which the services should be performed;
   encoding a first set of bits included in a header of the packet in one or more sequences of bits based on the determined service information for the packet, wherein each sequence of bits includes a first portion indicating a service applicable to the packet and a second portion indicating service status information for an associated service, wherein an order of the sequences of bits indicate service sequence information;
   encoding a second set of bits included in the header based on packet classification information that includes classification status information indicating whether the packet has been classified, and information indicating the packet class associated with the packet, wherein the second set of bits is assigned based on the service coding information;
   providing a service to the packet based on information included in the first portion of an encoded sequence of bits; and
   updating the service status information in the second portion of the encoded sequence of bits to indicate that the service specified by the first portion of the sequence of bits has been provided to the packet.

9. The method of claim 8, further including attaching the first set of bits in the header of the received packet.

10. The method of claim 9, wherein the header is readable by plural nodes in the network.

11. The method of claim 10, wherein the header includes a multi-protocol label switching (MPLS) protocol header.

12. The method of claim 8, further including employing the encoded first set of bits to selectively implement one or more services.

13. The method of claim 8, wherein the header includes at least one of:
   a layer-2 tunneling protocol (L2TP) header;
   a generic route encapsulation (GRE) header; and
   a multi-protocol label switching (MPLS) header.

14. The method of claim 13, wherein the header corresponds to a header employed by a preexisting protocol for communications between the nodes.

15. The method of claim 8, further comprising:
   receiving the packet from a first service node;
   examining whether the second set of bits included in the header is encoded; and
   based on the examining, determining that the second set of bits is encoded such that the packet is already classified and further classifying the packet into a packet class is not performed.

* * * * *